United States Patent [19]

Kato

[11] Patent Number: 4,503,006

[45] Date of Patent: Mar. 5, 1985

[54] METHOD AND APPARATUS FOR MANUFACTURING TAG PIN ASSEMBLIES

[75] Inventor: Masami Kato, Nagoya, Japan

[73] Assignees: Toska Co., Ltd., Tokyo, Japan; Ben Clements & Sons, Inc., South Hackensack, N.J.; Japan Bano'k Co., Ltd., Tokyo, Japan

[21] Appl. No.: 402,659

[22] Filed: Jul. 28, 1982

[51] Int. Cl.³ .............................................. B29D 5/00
[52] U.S. Cl. ..................................... 264/148; 83/424; 83/861; 264/145; 264/158; 264/210.1; 264/290.5; 264/291; 425/297; 425/305.1; 425/308; 425/315
[58] Field of Search ............ 264/145, 148, 158, 210.1, 264/290.5, 291; 425/297, 383, 305.1, 308, 315; 83/409.2, 424, 580, 861

[56] References Cited

U.S. PATENT DOCUMENTS

| | | | |
|---|---|---|---|
| 3,405,577 | 10/1968 | Cousino | 83/861 |
| 3,577,987 | 5/1971 | Bronnenkant | 264/291 |
| 3,942,237 | 3/1976 | Ongaro | 264/148 |
| 4,056,593 | 11/1977 | Albareda | 264/145 |
| 4,062,919 | 12/1977 | Rojahn et al. | 264/145 |
| 4,063,481 | 12/1977 | Raudys et al. | 83/580 |
| 4,183,894 | 1/1980 | Paradio | 425/383 |
| 4,189,809 | 2/1980 | Sotos | 264/145 |
| 4,213,527 | 7/1980 | Lapeyre et al. | 264/150 |
| 4,262,570 | 4/1981 | Doyle | 83/580 |
| 4,276,255 | 6/1981 | Russell | 264/291 |

FOREIGN PATENT DOCUMENTS 2039245 8/1980 United Kingdom ................ 264/148

Primary Examiner—James B. Lowe
Attorney, Agent, or Firm—Blum, Kaplan, Friedman, Silberman & Beran

[57] ABSTRACT

A method of manufacturing tag pin assemblies in which individual tag pins each comprising a head and a crossbar integrally connected by a filament are integrally but severably connected in the thickness direction, which method comprises the steps of continuously molding block tag-pin blanks of a sectional configuration corresponding to the individual tag pins, and of cutting the block tag-pin blank into slices having the prescribed thickness and altogether connected with an uncut portion respectively thereof. Apparatus for practising the method is also disclosed, which comprises an extruder provided with a die for continuously extruding block tag-pin blanks, and a cutter device for cutting the block tag-pin blank into slices having the prescribed thickness and altogether connected with an uncut portion respectively thereof.

12 Claims, 6 Drawing Figures

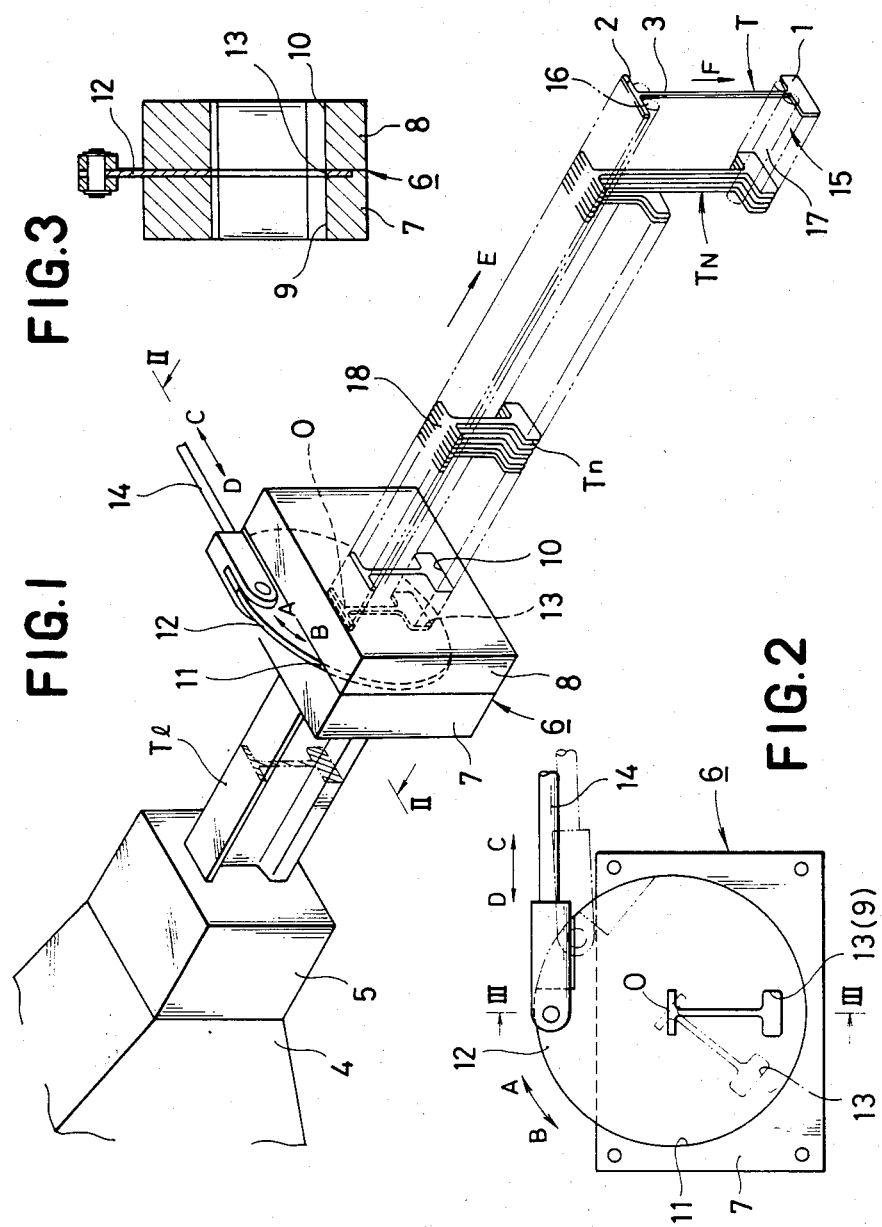

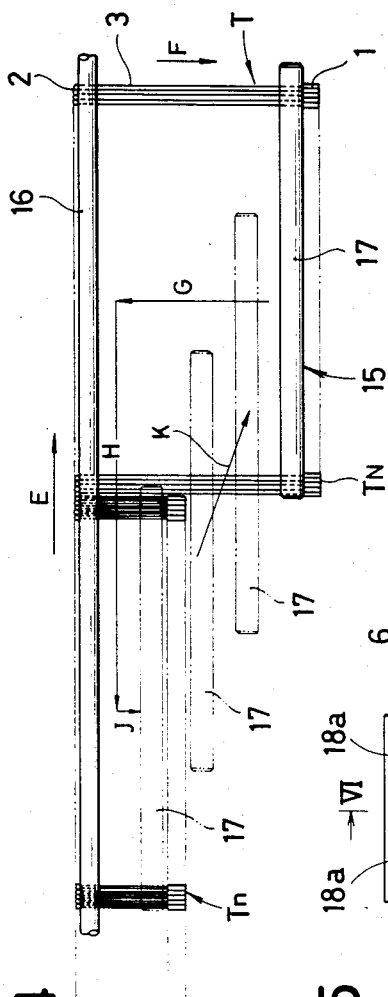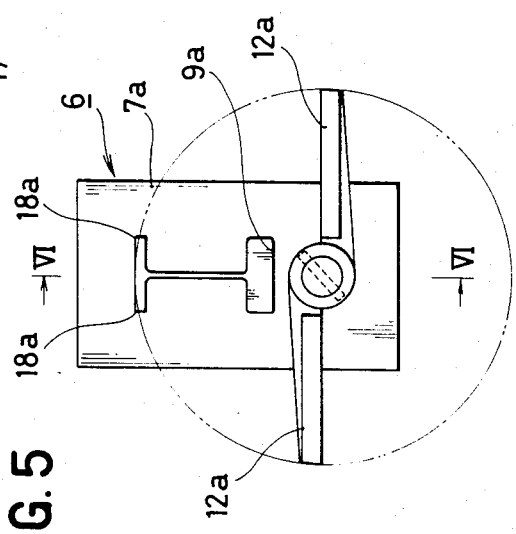

METHOD AND APPARATUS FOR MANUFACTURING TAG PIN ASSEMBLIES

BACKGROUND OF THE INVENTION

The present invention relates to a method of and apparatus for manufacturing filament-type tag pins in the form of such an assembly in which individual tag pins are integrally but severably connected in the direction of their thickness, and more particularly, to a method of and apparatus for manufacturing tag pin assemblies which enable to remarkably cut down the production cost of tag pins and yet manufacture such tag pin assemblies the handling of which is greatly easified.

Today publicly known are filament-type tag pins which are molded from a synthetic resin such as nylon for example to individually comprise a head and a crossbar integrally connected by a filament to an overall arrangement generally resembling letter H and which are widely utilized in for example attaching to merchandise price tags, other indication tags or the like, or in connecting a plurality of goods to one another.

As indicated above, tag pins are often used as attachment elements for price tags or the like to be anchored to merchandise, and in such use of tag pins, they are loaded in a dispensing device provided with an application needle having a C-shaped cross-section, assembly by assembly in the form of which they are manufactured and supplied and which comprises a number of tag pins integrally connected in the thickness direction thereof. The application needle is applied through a price tag or the like and then applied from this side to the far side of an object or an item of merchandise. When an operation lever of the dispensing device is then manipulated, a first tag pin of the loaded tag pin assembly is severed from a second one, and its crossbar is pushed into the needle and guided in the needle to reach the far side of the object in a condition of the crossbar flexed and lying substantially parallel to the filament of the tag pin. As soon as the crossbar is driven enough deep to come out of the needle, the latter may be pulled back out of the object and the price tag or the like, whereby the price tag or the like becomes anchored to the object, with the crossbar restoring its original perpendicular position relative to the filament.

Tag pins for use as exemplified above have drawn a wide public attention in that they can remarkably simplify the operation for example for tag attachment to merchandise which in the past was carried out with use of threads, yarns, strings or the like, and they are today utilized in large quantities in for example connecting price tags to a large number of garments and so forth. Accordingly, it is strongly required of tag pins that they can afford a high operation efficiency and can be manufactured at as low a cost as possible, and in the light of this, they are manufactured in assemblies having on the single carrier rod respectively thereof as many a number of member tag pins as possible so as thereby to reduce the number of molding shots and also to facilitate handling of tag pins.

In the conventional manufacture of tag pins, it has been indispensable for reasons to do with molding that in forming a tag pin assembly in which member pins are arranged in a great number in their thickness direction, the inter-pin pitch has a relatively great value. That is to say, whereas tag pin assemblies are formed in a mold, it is necessary to provide a partition wall between each adjacent molding cavities in the mold in order to form individually independent tag pins. Thus, it is indispensably required that the mold should provide for a space or spaces for the partition walls, and the inter-pin pitch of a molded tag pin assembly comes to be such as generally corresponding to the thickness of the head or the crossbar, which is relatively great, and the thickness of the partition wall, in combination.

Then, to set the inter-pin pitch of a tag pin aseembly as above and to form tag pins integrally connected on their common carrier rod accompany generation of the following difficulties:

(1) The number of tag pins in a single tag pin assembly is limited to 50 to 60 at best, so that in manipulating tag pins by a dispensing device, loading of a tag pin assembly should necessarily be operated in an accordingly increased frequency, whereby the operation efficiency in dispensing tag pins is affected.

(2) Whereas a number of tag pin assemblies are packed in a container for their transportation, storage and so forth, with tag pin assemblies having a relatively large inter-pin pitch, their individual pins are prone to be mutually entangled, and to disentangle tag pins once entangled requires a time consuming operation.

(3) In the tag pin assembly, the member tag pins are arranged on their common carrier rod, and when tag pins are dispensed, there becomes the carrier rod left as a waste to be simply discarded. This means a waste of the synthetic resin material, and also is reflected upon the price of tag pins.

(4) According to an increase in the molding shot number, the unit price of tag pins is raised. Seeing that the unit price in reference is so expensive as to be on the order of one-hundredth of one Yen Japanese, significant is the influence of the increase in the molding shot number on the unit price of tag pins.

Now that tag pins are put for massive consumption, each of the above enumerated difficulties means an extremely important problem, and a solution thereof has been keenly sought for.

SUMMARY OF THE INVENTION

Thus, the present invention has been made as a result of a series of studies based on a changed concept of approach to the required solution of the above-indicated problems, and it has as its primary object to provide a method of and apparatus for manufacturing tag pin assemblies which enable to form a tag pin assembly having an extremely large number of member pins connected in a substantially contacting arrangement in their thickness direction, eliminate generation of waste of the material and entanglement of individual pins, enhance the operation efficiency for the tag pin manipulation or dispensing attributable to a reduction in the frequency of the loading of tag pin assemblies, and cut down the production cost of tag pins.

To attain such object, the invention provides such a method of manufacturing tag pin assemblies in which individual tag pins each comprising a head and a crossbar integrally connected by a filament are integrally but severably connected in their thickness direction, which is characterized by the steps of continuously molding block tag-pin blanks of a sectional configuration corresponding to individual tag pins, and cutting the block blank into slices having the prescribed thickness and altogether connected with an uncut portion respectively thereof. The invention also provides apparatus for manufacturing tag pin assemblies of the above-mentioned type, which is characterized by an extruder provided with a die for continuously extruding block tag-pin blanks and a cutter device for cutting the block blank into slices having the prescribed thickness and altogether connected with an uncut portion respectively thereof.

BRIEF DESCRIPTION OF THE DRAWINGS

The accompanying drawings are taken for illustration of the method and apparatus embodying the present invention, in which:

FIG. 1 is a perspective view of the apparatus;

FIG. 2 is a view taken on line II—II in FIG. 1;

FIG. 3 is a sectional view taken on line III—III in FIG. 2;

FIG. 4 shows a view taken for illustration of operation in or with a stretching device;

FIG. 5 is a similar view to FIG. 2 and shows a different embodiment of the invention; and FIG. 6 shows a sectional view taken on line VI—VI in FIG. 5.

DESCRIPTION OF THE PREFERRED EMBODIMENTS

As before stated, tag pins which are indicated in FIG. 1 at the letter T individually comprises a head 1 and a crossbar 2 which are integrally connected by a filament 3 to an overall configuration generally resembling the letter H.

Also as shown in FIG. 1, apparatus for practising the method of the invention includes an extruder 4, in front of which disposed is a die 5 for continuously extruding block tag-pin blanks T1 from a heat-molten synthetic resin such as nylon for example, each block tag-pin blank having a sectional configuration corresponding to the tag pin T. In front of the die 5, a cutter device 6 is disposed, which cuts the block blank of tag pins T1 into slices including a common uncut part through which they are altogether connected to comprise a tag pin assembly. Although not shown, between the die 5 and the cutter device 6 there may be disposed suitable conveying device and cooling device. The conveying device may comprise any of normally employed conveyor devices, and with the cooling device, while it may be any of cooling media of water, oil and air, it may preferably comprise a device of an oil cooling system in order to facilitate a high cooling performance in a relatively short time.

As shown in FIGS. 1 to 3, the cutter device 6 comprises a block-blank guide member 7 and a tag-pin assembly guide member 8, which are integrally assembled for example by bolting (FIG. 2). Guide members 7 and 8 are bored with guide through-holes 9 and 10, respectively, the configuration of which conform to the tag pin T. In confronting faces of the guide members 7 and 8, a cutter guide groove 11 is formed, in which a cutter member 12 of a substantially circular configuration is rotatably mounted by fitting. In this part of the cutter member 12 which in position corresponds to the aligned guide holes 9 and 10, a cutter groove 13 corresponding in both size and shape to guide holes 9 and 10 is formed in an arrangement such that relative to the point at which the crossbar 2 and the filament 3 of the tag pin T connect to each other, the center of rotation, O, of the cutter member 12 is eccentric and is located appreciably closer to the side of the crossbar 2. Thus, when the cutter 12 is rotated in directions shown by the bidirectional arrow A–B in FIG. 2, the cutter groove 13 is rotated about the abovementioned center of rotation O relative to guide through-holes 9 and 10. The width or thickness of the disk-type cutter member 12 may be identical with the thickness of a single tag pin T or the total thickness of a plurality of tag pins T. The cutter member 12 may be driven to rock in directions shown by the arrow A–B by a suitable actuator (not shown) through a connection rod 14 operable to move in directions shown by the bidirectional arrow C–D in FIG. 2. Further, it may preferably be devised to provide a positioning stopper (not shown) to for example the block blank guide 7 so that the cutter groove 13 can be registered with guide holes 9 and 10.

In front of or at a position downstream of the cutter device 6 in the direction of transfer of tag pins to be produced, a stretching device 15 may be incorporated via a suitable conveying device (not shown). As shown in FIG. 1, the stretching device 15 comprises a pair of stationary bars 16 extended from the cutter device 6 in the direction of arrow E to hold crossbar 2 from below along the sides of filaments 3, which bars also function as guide bars for unstretched tag pin assemblies Tn and stretched tag pin assemblies TN, a pair of stretcher bars 17 mounted along the sides of the connection point of head 1 and filament 3 of tag pin T and adapted to move successively in directions of arrows G, H, J and K in FIG. 4 as the unstretched tag pin assembly Tn is transferred in the direction of arrow E in FIGS. 1 and 4, and a driving mechanism (not shown) for the stretcher bars 17.

Then, a description will now be entered in connection with the operation of the method of the present invention with use of the above described apparatus.

With reference to FIG. 1, it will be operated to extrude a block tag-pin blank T1 of nylon for example by the die 5 and transport the extruded block blank T1 through a conveyor device (not shown) to the cutter device 6. During the course of its transportation, the block blank T1 is cooled by a cooling device (not shown) to a temperature at which the cutting at the next operation step can be facilitated. The block blank of tag pins thus transported while being cooled reaches the cutter device 6, and is moved to reach the cutter disk 12 through the guide through-hole 9 of the block blank guide member 7. When the block blank T1 has then entered the cutter groove 13 of the cutter member 12 a distance comparable to the thickness of a single tag pin T, the connection rod 14 may be moved in the direction C of the bilateral arrow C–D by an actuator (not shown), whereupon the cutter member 12 is rotated about its rotatory center O, whereby the block blank T1 becomes cut to produce a single tag pin portion sliced out thereof in a manner of a small area portion thereof in the vicinity of the rotatory center O of the cutter member 12 remaining uncut. Such cutting or slicing of the block blank of tag pins T1 may be operated in repetition to there produce an unstretched tag pin assembly Tn having a number of tag pins integrally connected as shown at 18, which nevertheless are individually severable when dispensed by a dispensing device. It will be readily appreciated that unstretched tag-pin assemblies Tn can be produced in a continuous manner of production, one after another.

When it is required to stretch the filaments of above produced unstretched tag pins, further, stretcher bars 17 may be put for operation: At a same speed as the tag-pin assembly Tn moving in the direction of arrow E as shown in FIG. 4, the stretcher bars 17 originally at the position shown by J may be moved in the same direction of the arrow E while it is concurrently moved toward below as shown by arrow F, that is, it may be moved in the direction shown by arrow K, composite of the directions E and F, whereby the prescribed number of pins of the unstretched tag-pin assembly Tn becomes stretched while they are moved in the direction of the arrow E.

As a result of the above, it is feasible according to the method of the present invention to continuously manufacture tag-pin assemblies with the operations worked in a continuous run from the production of a block tag-pin blank Tl to that of a stretched tag-pin assembly TN, and yet manufacture such tag-pin assemblies Tn or TN of which member tag pins T are so densely arranged as to have substantially no gap formed between each adjacent pins.

Upon completion of the stretching operation, the stretcher bars 17 may be moved successively in the directions of arrows G, H and J as shown in FIG. 4, to be ready for stretching a next unstretched tag-pin assembly Tn.

Further, according to another embodiment of the present invention, the cutter device 6 may comprise, in lieu of the cutter member 12, rotary cutter blades as shown at 12a in FIGS. 5 and 6. In this case, preferably an arrangement may be made such that the rotatory center of the cutter blades 12a is eccentrically disposed relative to the aligned guide holes 9a and 10a respectively of the block-blank guide member 7a and the tag-pin assembly guide member 8a and also that the cutter blade 12a has an effective cutting length great enough to cut with its outer end a central portion in the length of the crossbar but not the virtually square upper corners of the crossbar as shown in FIG. 5.

In the case of this embodiment, this portion of each tag pin which is to be left uncut through the cutter device 6 is formed at opposite ends of the crossbar 2 as indicated at 18a in FIG. 5, so that with the cut or sliced tag-pin assemblies Tn or TN, they are not likely to undergo twisting in sideways, whereby effectively avoided can be an inconvenience such that some out of the whole tag pins T of a tag-pin assembly are laterally projected in packing them for storage or transportation or in dispensing them relative to various objects.

As stated above, according to the present invention, a tag-pin assembly can be formed in which a great number of pins are arranged in a condition substantially contacting one another in their thickness direction, whereby it is feasible to prevent an inter-pin tangling from occurring. Also, a tag-pin assembly can have an increased number of individual tag pins, so that the number of loading tag pin assemblies in a dispensing device can be reduced with the result that the operation efficiency for dispensing tag pins can be enhanced. Further, with the tag pin assemblies manufactured according to the present invention, they are devoid of a carrier rod for connecting individual pins altogether in conventional tag-pin assemblies, so that according to the invention a saving can be effected of the material synthetic resin.

What is claimed is:

1. A method of manufacturing tag pin assemblies, each said assembly having a plurality of individual tag pins, said individual tag pins comprising a head and a cross bar integrally connected by a filament, said individual tag pins being severably connected but abutting in their thickness direction, which method comprises the steps of continuously molding block tag-pin blanks of the sectional configuration corresponding to said individual tag pins by continuously extruding a synthetic resin from an extruder through a die, guiding each block tag-pin blank in the region of a cutter by means of guide member means having at least one guide hole of a shape conforming to that of the individual tag pins, and cutting the block tag-pin blank while the blank is in the region of the guide member means into slices having the prescribed thickness, while leaving an uncut portion in the cross bar, to thereby form a tag pin assembly.

2. A method as claimed in claim 1, wherein said synthetic resin comprises nylon.

3. A method as claimed in claim 1, wherein said step of cutting block tag-pin blanks into slices comprises guiding the block tag-pin blanks into guide holes of a configuration conforming to that of the tag pin formed in a block-blank guide member and a tag-pin assembly guide member which are integrally assembled in a cutter device, and cutting the block blanks into slices having the prescribed thickness and an uncut portion in the crossbar using a cutter member rotatably mounted between said block-blank guide member and said tag-pin assembly guide member.

4. A method as claimed in claim 1, wherein said block tag-pin blank is cut into slices leaving an uncut portion having at least two regions spaced longitudinally of the crossbar, whereby said two uncut regions tend to prevent relative twisting of adjacent tag pins.

5. A method as claimed in claim 1, which further comprises the step of stretching tag pin assemblies.

6. A method as claimed in claim 5, wherein said step of stretching tag pin assemblies comprises placing a pair of stretcher bars on opposed sides of the aligned filaments in engagement with the heads of the aligned tag pins, and displacing said stretcher bars in a direction away from the aligned crossbars while retaining said crossbars.

7. A method as claimed in claim 1, wherein said cutting of said block tag-pin blank is by a rotatably mounted cutter.

8. A method as claimed in claim 7, wherein said rotatably mounted cutter includes a cutter groove of a shape conforming to that of the individual tag pins and positioned for alignment with the at least one guide hole of the guide member means, including the step of rotating said cutter about a center of rotation located in said cutter groove appreciably closer to the crossbar region than to the head region of the tag pin-shaped cutter groove, whereby the uncut portion of said tag pin assembly is at said center of rotation.

9. Apparatus for manufacturing tag pin assemblies, each said assembly having a plurality of individual tag pins, said individual tag pins comprising a head and a crossbar integrally connected by a filament, said individual tag pins being severably connected but abutting in their thickness direction, which comprises an extruder provided with a die for continuously extruding block tag-pin blanks having a sectional configuration corresponding to the tag pin, and a cutter device for cutting said block tag-pin blanks into slices having the prescribed thickness and altogther connected with an uncut portion respectively thereof, said cutter device comprising integrally assembled block-blank guide member and tag-pin assembly guide member each formed with a guide hole therethrough shaped to conform to the configuration of the tag pin, said guide members defining a gap therebetween, and a cutter member rotatably mounted in said gap between said guide members.

10. Apparatus as claimed in claim 9, said gap defined by said guide members being substantially cylindrical, said cutter member being substantially cylindrical and supported for rotation in said cylindrical gap, said substantially cylindrical cutter member being formed at its portion corresponding in position to said guide holes with a cutter groove corresponding in both size and shape to the guide holes, the center of rotation of said cutter member being located in said cutter groove appreciably closer to the crossbar region than to the head region of the tag pin shaped cutter groove, whereby the uncut portion of said tag pin assembly is at said center of rotation.

11. Apparatus as claimed in claim 9, wherein said cutter member has a substantially propeller-type cutter blade and has its rotatory center eccentrically disposed relative to said guide holes on the side of the head region, the cutter blade of the cutter member having an effective length great enough to cut said tag pin assemblies while leaving the outer corners of the crossbar of the tag pin uncut.

12. Apparatus as claimed in claim 9, which further comprises a stretching device for stretching filaments of the unstretched tag pin assemblies sent out of said cutter device, said stretching device comprising a pair of stationary bars extended from said cutter device on opposed sides of the filaments of unstretched tag pin assemblies for supportin said assemblies by the crossbars thereof engaging said stationary bars, and a pair of stretcher bars disposed on opposed sides of the filaments of said unstretched tag pin assemblies and positionable in engagement with the inner regions of the heads of said assemblies, said stretcher bars being adapted for displacement in the direction away from said crossbars to effect stretching.

* * * * *